UNITED STATES PATENT OFFICE.

EDGAR S. BUFFUM, OF NEWTON, MASSACHUSETTS.

SUPERFICIAL FINISHING OF WOODEN ARTICLES.

1,197,601.  Specification of Letters Patent.  Patented Sept. 12, 1916.

No Drawing.  Application filed September 3, 1912. Serial No. 718,205.

*To all whom it may concern:*

Be it known that I, EDGAR S. BUFFUM, a citizen of the United States, residing at Newton, in the county of Middlesex and State of Massachusetts, have invented new and useful Improvements in the Superficial Finishing of Wooden Articles, of which the following is a specification.

This invention relates to the provision of wooden articles with a superficial finish by coating the same with a varnish or lacquer which after application is converted into a hard and permanent condition, and is particularly intended to provide a finish in the production of which a phenol resin varnish may be employed. Such a finish, when produced in accordance with my invention, is practically unaffected by heat or moisture and is therefore particularly serviceable in the case of wooden articles which are likely to be wet in use, such as hair and other brushes, and by way of example my invention is herein specifically described as employed in the finishing of a brush body by the application of a phenol resin varnish, although it is applicable as well to the finishing of a great variety of other wooden articles, as will be readily appreciated. The temperatures hereinafter referred to are based on the centigrade scale.

In accordance with my invention as preferably practised the brush body is first immersed in a quantity of melted rosin and allowed to remain therein until the air and moisture contained in the pores of the wood at and near its surface are thoroughly expelled. This treatment may occupy fifteen or twenty minutes, although it may be expedited by carrying it on in a substantial vacuum, and has the further effect of expanding the superficial pores of the wood. The brush body is then removed and allowed to cool until the rosin carried in and on its surface has solidified, whereupon it is scraped until the surface of the wood is exposed, thereby removing any surplus rosin. The surface is then rendered smooth in any suitable manner, as by sandpapering it, and the smooth surface is then coated with a varnish such as is produced by dissolving a phenol resin in its soft state in a quantity of alcohol or other volatile solvent, the term "phenol resin" being herein used to denote any one of a variety of condensation products of which a common example is formed when phenol and formaldehyde are caused to react on each other under certain conditions well known to chemists. Instead of dissolving the phenol resin "gum" in a solvent to produce the varnish, the condensation product itself while still in its initial liquid form may be employed for that purpose. The varnish is then allowed to get thoroughly dry, and preferably this is done at atmospheric temperatures and very slowly, a week or ten days being none too long for effecting the complete evaporation of the alcohol solvent, if that is employed. The resinous constituent of the varnish is then converted into the so-called hard condition, preferably by the application of heat thereto at a temperature substantially less than that at which rosin is melted, although as a matter of fact the conversion of the resinous constituent of a phenol resin varnish will occur in time at ordinary atmospheric temperatures. For the sake of hastening the process, however, it is preferable to employ heat, the length of the time required for effecting the conversion varying with the intensity of the heat. For example, I have found that if the brush body is baked at a temperature of 60° the resinous constituent of the varnish will be converted in about forty-eight hours, while by baking the brush body at a temperature of 100° conversion will be completed in four or five hours. This conversion of the varnish completes the process, except that one or more additional coats of varnish may be applied in like manner, if desired, the brush body being rubbed down prior to each application, and the result is a smooth, lustrous and durable superficial finish which gives the article an attractive appearance as well as the waterproof and heat-resisting qualities which are characteristic of phenol resins in their converted condition.

It has heretofore been attempted to finish wooden articles by the application of a phenol resin varnish, but so far as I am aware all such attempts have been unsuccessful on account of the formation of blisters in the applied varnish. By my invention this difficulty is overcome, since the air and moisture initially contained in the pores of the wood are expelled therefrom by the treatment with melted rosin, so that they cannot work out and form blisters in the varnish after the latter has been applied, nor can such blisters be produced by the softening and exudation of the rosin itself, since it does not melt below a temperature of 136°, which is substantially higher than the temperature employed for converting the phenol resin into its hard and insoluble condition. The employment of rosin as a filler is an important feature of my invention, for the reasons above explained, and wooden articles treated with rosin as hereinbefore set forth may be coated with various convertible or baked-on varnishes or lacquers without departing from my invention, the details of the application of such varnishes and lacquers being well understood by those familiar with the art.

I claim as my invention:

1. A process of finishing a wooden article which consists in expelling air and moisture from the superficial pores of the article by subjecting the latter to the action of a melted filler which is solid at atmospheric temperatures, then permitting the filler to harden, then applying to the filled surface a convertible varnish and allowing the same to dry, and then subjecting the varnished article to a temperature below the melting point of the filler until the varnish has been converted.

2. A process of finishing a wooden article by subjecting the surface of the same to melted rosin until air and moisture are expelled from the superficial pores of the article, then allowing the rosin to harden and removing any surplus of the same, then applying to the filled surface a convertible varnish and allowing the same to dry, and then subjecting the varnished article to a temperature less than that required to melt the rosin until the varnish has been converted.

3. A process of finishing a wooden article by subjecting the surface of the same to melted rosin until air and moisture are expelled from the superficial pores of the article, then allowing the rosin to harden and removing any surplus of the same, then applying to the surface a phenol resin varnish and allowing the same to dry, and then subjecting the varnished surface to a temperature less than that required to melt the rosin until the resinous constituent of the varnish has been converted into its hard state.

4. A wooden article having a surface finish composed of a rosin filler permeating the superficial pores of the wood, and an overlying coating of phenol resin.

In testimony whereof, I have hereunto subscribed my name this 30th day of August, 1912.

EDGAR S. BUFFUM.

Witnesses:
E. D. CHADWICK,
JOSEPH T. BRENNAN.